Nov. 11, 1947.   L. J. HARRISS   2,430,566
PIE AND SIMILAR FOOD ARTICLE
Original Filed July 6, 1942
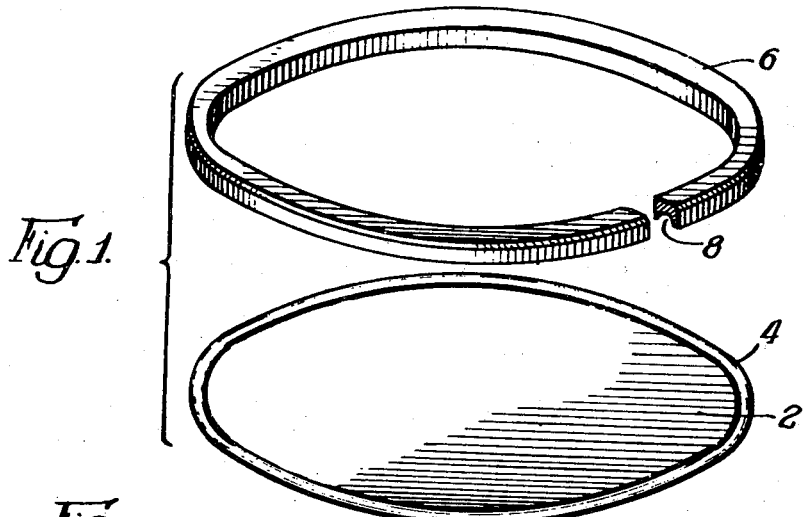
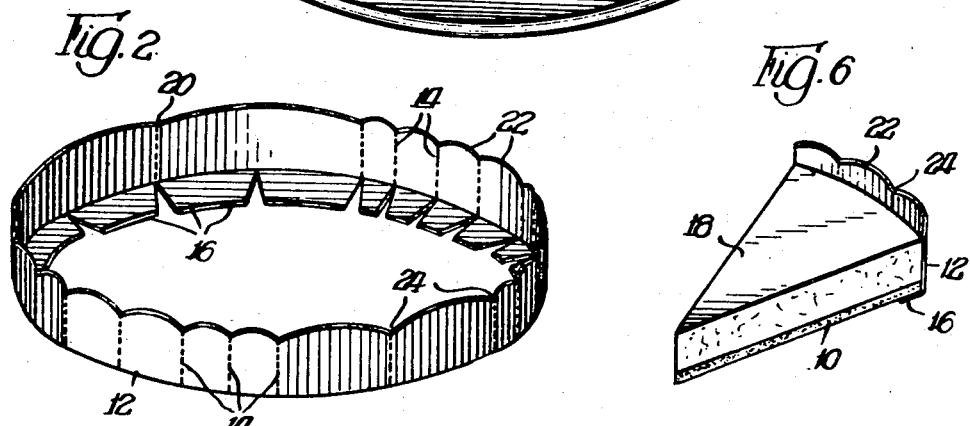
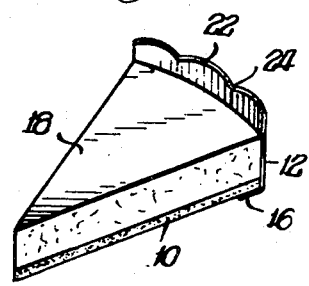
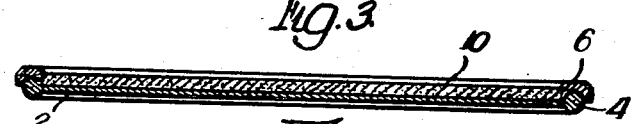
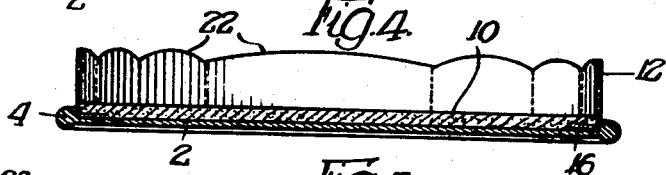
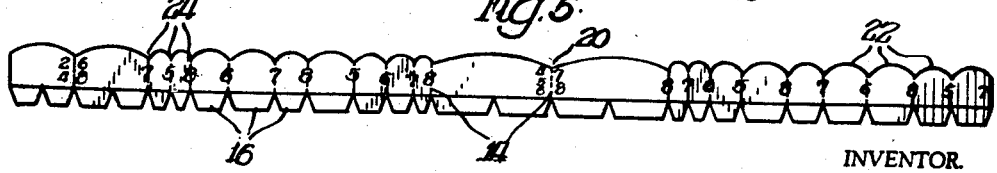
INVENTOR.
Lloyd J. Harriss,
BY
Spencer, Maryall, Johnston & Cook
attys.

Patented Nov. 11, 1947

2,430,566

UNITED STATES PATENT OFFICE 2,430,566

PIE AND SIMILAR FOOD ARTICLES

Lloyd J. Harriss, Kenilworth, Ill.

Original application July 6, 1942, Serial No. 449,866. Divided and this application March 31, 1943, Serial No. 481,219

3 Claims. (Cl. 99—171)

This invention relates in general to food articles having a baked dough or crust bottom and a filling, and more particularly to a novel type of pie.

This application is a division of my co-pending application, Serial No. 449,866, filed July 6, 1942, which has matured as Patent No. 2,411,857.

One of the objects of this invention is the provision of a new and improved food article easily divisible into equal sections for sale at drug counters, restaurants, and the like.

A further object of the invention is to provide a new type of pie having a flexible band surrounding it, which band not only bears indicia for properly proportioning the cuts of pie but also acts as a retaining means to prevent the pie filling from flowing beyond the edges thereof.

A still further and more specific object of the invention is to provide a new and improved combination of a flat pie crust, a flexible band such as paper disposed around the periphery of the pie crust and of sufficient width to provide a side enclosure for the space above the pie crust, an edible filling in said space within the confines of the crust and the band, a flat pan, preferably having a slight flange, supporting said crust, and means preferably comprising a flange or tongues on said band disposed between said pan support and said pie crust to hold the band in place and prevent leakage or escape of the filling.

Other objects and advantages of the invention will be apparent by reference to the following description in conjunction with the following drawings in which Fig. 1 is a perspective view of a utensil for baking the crust showing the parts thereof separated;

Fig. 2 is a perspective view of the circular measuring band;

Fig. 3 is a vertical section through the assembled baking utensil showing the bottom crust therein;

Fig. 4 is a vertical section through the baking utensil wherein the removal rim has been replaced by the measuring band; when the filling is added, as indicated by the dotted line $a$, this view also illustrates the appearance of the completed article or combination, ready for display or sale.

Fig. 5 is a developed view of the measuring band; and

Fig. 6 is a perspective view of a single cut of the pie.

Referring now more particularly to the drawings, the baking utensil which I have designed for use in carrying out the method of my invention includes a bottom plate or disk 2 provided at its peripheral edge with an annular bead 4. It will be obvious that this bead or rib can assume any desired configuration. However, for purposes of illustration I have chosen to show this bead as having a substantially circular cross section. It is desirable that this bead extend upwardly beyond the upper surface of the plate 2 to prevent any lateral sliding movement of the pie resting thereon.

A rim in the form of a ring 6 is provided on its under side with an annular groove 8. This groove has a configuration substantially complementary to the upper half of the bead 4, in this case semi-circular, so that it may fit snugly thereon.

Fig. 3 shows the utensil in assembled position, the ring 6 forming a rim within the confines of which the lower crust 10 is formed. While the lower crust may be formed of any suitable material customarily used in making pies, in actual practice I have made the crust of a graham cracker dough, the dough being placed on the plate 2 and manipulated so as to substantially fill the space within the ring 6. After the dough has thus been located in the utensil it is placed in an oven and properly baked. By baking a dough of this type a relatively thick self-supporting or stiff crust is formed, although the invention is not limited to a crust or dough of this type.

After the bottom crust has been baked and the utensil removed from the oven the ring 6 is removed from the plate. The bottom crust 10 is also then removed temporarily and a measuring band 12 is placed on the plate 2. This band, which is preferably formed of a flexible material such as paper, regenerated cellulose or the like, has a circumference which is substantially equal to the circumference of the plate 2 within the bead 4 and is provided throughout its length with a plurality of circumferentially spaced apart axially extending perforated lines 14. The bottom edge of the band 12 has a number of inwardly extending tapered tongues 16. After the band is properly located on the plate, the crust 10 is then replaced and rests on the tongues 16. After this step, any suitable filling 18 e. g., such as is used in pumpkin pies, custards, etc., is placed on the crust and within the confines of the band 12, say to the level $a$ of Fig. 4. It will therefore be seen that thus far in the making of the pie the measuring band serves in the manner of a side crust and acts to retain the filling and prevent its overflowing.

Any suitable filling may be used. However, it is desirable that it be of a consistency similar to custards, thick creams, or other substances which, although relatively soft, will take a "set" and which will not have too great a tendency to run after cutting.

It will be noted upon reference to Fig. 5 that each one of the perforated lines 14 along the length of the band 12 is identified by a number or numbers. In the example shown, these numbers range from 2 to 8, but it will be obvious that any additional numbers may be used if desired. These identifying numbers indicate the proper places to cut the pie in order to divide it into a predetermined number of equal portions. It is advisable in each case to have a common starting point and in Fig. 5 this is indicated by the numeral 20. Starting from this point then, supposing it is desired to cut the pie into eight equal portions. After the initial cut is made other cuts will be made around the pie wherever the numeral 8 occurs, thereby dividing the pie and the measuring band into eight equal portions. Likewise, if seven equal portions are desired a cut will be made on each perforated line indicated by the numeral 7 after the initial cut has been made along the line indicated at 20. A similar procedure will be followed in dividing the pie into any other number of equal parts. When it is to be divided into less than five equal portions, for example four or three, after the initial cut is made along the line 20, every other line indicated by the numeral 8 or every other line indicated by the numeral 6 will be cut.

This method of baking the bottom crust and completing the pie to the point where the filling has been placed within the measuring band will be performed at the bakery. The pie will then be shipped out in this condition. The cutting of the pie will not take place until just prior to serving, at which time the portion of the band remaining around the edge of the pie may be easily removed.

Some of the advantages arising out of this invention will be obvious. For example, restaurants will have less bulky pie plates to return to the bakery and it will not be necessary to divide the pie by the use of any additional means because the measuring band, being formed of a flexible material such as paper or the like, may be readily cut at the desired points and then thrown away. Furthermore, heretofore the sloping relatively high sides of the ordinary pie pan have caused difficulty in removing pie sections without tearing the crust, whereas the substantially flat plate 2 avoids such problems and the present invention makes it possible to prepare pie in sections having an appearance which is neat and pleasing to the eye.

While the upper edge of the indicating band 12 may obviously be smooth if desired, I have preferred to provide a scalloped edge thereon with raised portions such as at 22 which terminate in indentations 24 at each of the perforated lines so that a person cutting the pie can easily locate the exact position of the perforated line along which he desires to cut.

Having thus described the invention, what I claim as new and desire to secure by Letters Patent of the United States is:

1. A food article comprising a substantially flat baked pastry dough, a flexible band disposed around the periphery of said dough and of sufficient width to provide a side enclosure for the space above said dough, having an edible filling in said space within the confines of said dough and said band, said band being provided with a plurality of axial perforated lines and indicia on said lines designating a predetermined number of equal portions.

2. A pie comprising a substantially flat baked pie crust, a flexible band of sheet material vertically disposed around the periphery of said pie crust and of sufficient height to provide a side enclosure for the space above said pie crust, a relatively mobile pie filling in the space above said pie crust within the confines of said pie crust and said band, means for anchoring said band beneath and in contact with the pie crust, a plurality of vertical lines of severance on said band extending from a point below the upper edge of the pie crust to a point above said filling, and a plurality of projections and recesses along the upper edge of said band, said recesses being formed by sharply intersecting indentations which also intersect with the upper extremity of said lines of severance.

3. A food article comprising a substantially flat baked pie crust, a flexible band of sheet material vertically disposed around the periphery of said pie crust, and of sufficient height to provide a side enclosure for the space above said pie crust, a plurality of flanges at the bottom of said band extending inwardly beneath the bottom of said pie crust, a custard pie filling in the space above said pie crust within the confines of said pie crust and said band, a plurality of vertical lines of severance on said band extending from a point below the upper edge of the pie crust to a point above said filling, said lines being spaced at varied intervals calculated to divide said article into fractional parts of varied sizes, and a plurality of projections and recesses along the upper edge of said band, said recesses being formed by sharply intersecting indentations which also intersect with the upper extremity of said lines of severance, and serve to guide a cutting knife to said intersections.

LLOYD J. HARRISS.

REFERENCES CITED

The following references are of record in the file of this patent:

UNITED STATES PATENTS

| Number | Name | Date |
| --- | --- | --- |
| 2,093,307 | Clive | Sept. 14, 1937 |
| 2,283,380 | MacManus | May 19, 1942 |
| 1,994,214 | Frost | Mar. 12, 1935 |
| 1,936,312 | Snyder | Nov. 21, 1933 |
| 2,159,997 | Millar | May 30, 1939 |

FOREIGN PATENTS

| Number | Country | Date |
| --- | --- | --- |
| 611,263 | France | 1926 |